(12) United States Patent
Sechrist

(10) Patent No.: US 8,052,777 B2
(45) Date of Patent: Nov. 8, 2011

(54) VESSEL, SYSTEM, AND PROCESS FOR MINIMIZING UNEQUAL FLOW DISTRIBUTION

(75) Inventor: Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 341 days.

(21) Appl. No.: 12/493,771

(22) Filed: Jun. 29, 2009

(65) Prior Publication Data

US 2010/0326275 A1 Dec. 30, 2010

(51) Int. Cl.
*B01D 53/02* (2006.01)

(52) U.S. Cl. .......... 95/90; 95/96; 95/148; 96/130; 96/143

(58) Field of Classification Search .......... 95/96, 90, 95/97, 148; 96/130, 148; 55/418
See application file for complete search history.

(56) References Cited

U.S. PATENT DOCUMENTS

| | | | |
|---|---|---|---|
| 3,430,418 A | 3/1969 | Wagner | |
| 3,564,816 A | 2/1971 | Batta | |
| 3,986,849 A | 10/1976 | Fuderer et al. | |
| 5,759,242 A | 6/1998 | Smolarek et al. | |
| 6,334,889 B1 | 1/2002 | Smolarek et al. | |
| 6,340,382 B1 | 1/2002 | Baksh et al. | |
| 6,506,234 B1 | 1/2003 | Ackley et al. | |
| 6,770,120 B2 * | 8/2004 | Neu et al. | 95/96 |
| 7,122,073 B1 | 10/2006 | Notaro et al. | |
| 7,128,775 B2 | 10/2006 | Celik et al. | |
| 7,166,151 B2 | 1/2007 | Baksh et al. | |
| 7,393,394 B2 | 7/2008 | Nowobilski et al. | |
| 2008/0022851 A1 | 1/2008 | Lee et al. | |
| 2008/0105122 A1 | 5/2008 | Leitgeb et al. | |

OTHER PUBLICATIONS

Akkimaradi et al., Effect of Packing Density and Adsorption Parameters on the Throughput of a Thermal Compressor, Carbon, 2002, vol. 40, No. 15, pp. 2855-2859.

Cichelli, Design of Heat Exchanger Heads for Low Holdup, Chemical Engineering Progress, Publisher: E.I. du Pont de Nemours & Co., Inc., Published in: Wilmington, DE, May 1956, vol. 52, No. 5, p. 213-218.

Ning et al., Influence of Maldistribution on Breakthrough of Fixed Bed Adsorber, Environmental Science, Sep. 30, 1998, vol. 19, No. 5, pp. 69-71.

Ning et al., Numerical Simulation of the Effect of Maldistribution in a Fixed Bed Adsorber, Chinese Journal of Chemical Engineering, Dec. 1997, vol. 5, No. 4, pp. 304-315.

Schork et al., A Shortcut Computational Method for Designing N2 PSA Adsorbents, Industrial & Engineering Chemistry Research, Oct. 1993, vol. 32, No. 10, pp. 2226-2235.

Shirley et al., PSA Performance of Densely Packed Adsorbent Beds, AIChE Journal, Jun. 1995, vol. 41, No. 6, pp. 1389-1394.

Winterberg et al., Impact of Tube-to-Particle-Diameter Ratio on Pressure Drop in Packed Beds, AIChE Journal, May 2000, vol. 46, No. 5, pp. 1084-1088.

* cited by examiner

*Primary Examiner* — Robert A Hopkins
(74) *Attorney, Agent, or Firm* — Mark Goldberg

(57) ABSTRACT

One exemplary embodiment can be a pressure swing adsorber vessel. The pressure swing adsorber vessel can include one or more walls. Generally, the one or more walls contain an adsorbent bed having a first side and a second side and at least one spacer forming a cusp. Usually, the one or more walls and the adsorbent bed define at least one void volume adjacent to the adsorbent bed, and the cusp of the at least one spacer may be positioned in the at least one void volume. The cusp can be positioned opposing an incoming feed stream or a desorbent stream.

16 Claims, 2 Drawing Sheets

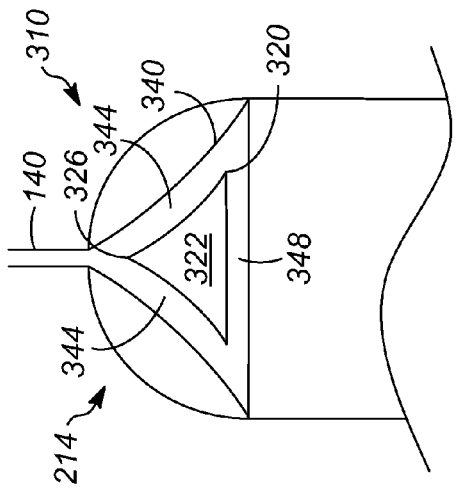
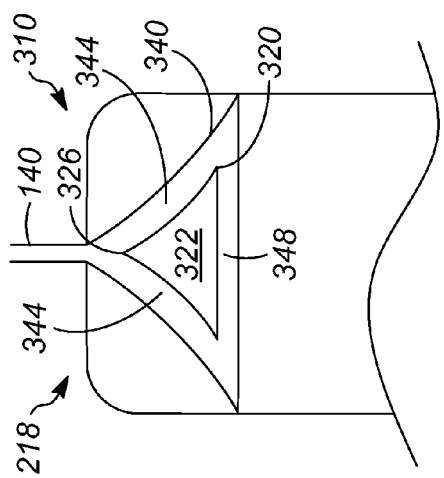
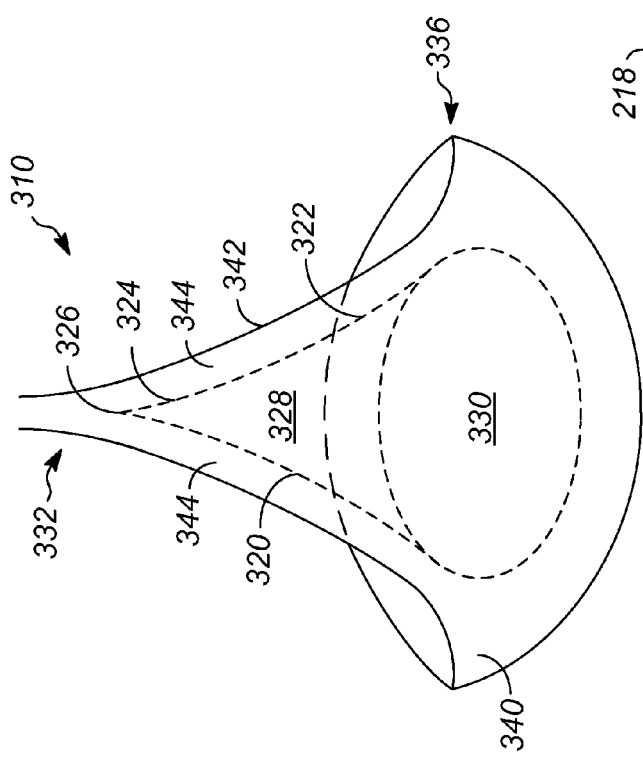

VESSEL, SYSTEM, AND PROCESS FOR MINIMIZING UNEQUAL FLOW DISTRIBUTION

FIELD OF THE INVENTION

This invention generally relates to a vessel, system, and process for minimizing unequal flow distribution.

DESCRIPTION OF THE RELATED ART

Pressure swing adsorption (hereinafter may be abbreviated as "PSA") processes can separate selectively adsorbable components, such as, carbon monoxide, carbon dioxide, methane, ammonia, hydrogen sulfide, argon, nitrogen, and water, from gas mixtures. Often, one or more of these components are adsorbed to purify a fluid stream, such as a hydrogen gas. Typically, a PSA process can include an adsorber that includes a vessel surrounding an adsorbent bed, including one or more adsorbent particles. Generally, a void space in the adsorber vessel can include spaces inside particles, spaces between particles, and internal spaces or void volumes defined by the walls of the vessel and the adsorbent bed.

These void volumes, also referred to as a "non-selective volume", can decrease the performance of the adsorbent. Although adsorbent can be placed in the non-selective volume, such a solution is undesirable as it affects the distribution of gases through the adsorbent bed. Desirably, the distribution is uniform, but placing adsorbent in the non-selective volume can create non-uniformity that is generally undesirable. Generally, it would be desirable to minimize the non-selective volume surrounding the adsorbent bed without increasing flow non-uniformity through the adsorbent.

SUMMARY OF THE INVENTION

One exemplary embodiment can be a pressure swing adsorber vessel. The pressure swing adsorber vessel can include one or more walls. Generally, the one or more walls contain an adsorbent bed having a first side and a second side and at least one spacer forming a cusp. Usually, the one or more walls and the adsorbent bed define at least one void volume adjacent to the adsorbent bed, and the cusp of the at least one spacer may be positioned in the at least one void volume. The cusp can be positioned opposing an incoming feed stream or a desorbent stream.

Another exemplary embodiment may be a process for minimizing unequal flow distribution in a pressure swing adsorption system. The process can include positioning at least one spacer in a void volume of an adsorber vessel. Usually, the spacer forms a channel having a substantially constant cross-sectional area in a direction of a fluid flow.

Yet a further exemplary embodiment can be a pressure swing adsorption system. The pressure swing adsorption system can include a first vessel including one or more walls and a second vessel containing at least one adsorbent bed. Typically, the first vessel contains an adsorbent bed having a first side and a second side and at least one spacer including at least one part forming a hemi-pseudosphere. The one or more walls and adsorbent bed may define at least one void volume adjacent to the adsorbent bed. Generally, the at least one spacer is positioned in the at least one void volume.

The embodiments provided herein can provide a relatively inexpensive and easily installable spacer or insert inside the adsorber vessel. Preferably, the spacer can include at least one of a first part including a deflector and a second part including a diffuser. The deflector can form a substantial cone-shape with a base forming a polygon or a loop and parallel to a top side of an adsorbent bed. The diffuser can form an inverted funnel or a hemi-pseudosphere. The deflector can be nested with a diffuser to form at least one channel having a substantially constant cross-sectional area in a direction of fluid flow. Moreover, preferably the spacer may be centered about a vertical line passing through a middle of the adsorber vessel to make a smooth transition from an external pipe to the adsorbent bed. Typically, a small space is between the spacer and the adsorbent bed to allow gas to flow there-between. The inlet and outlet spacers can offset each other's flow maldistribution due to the balance of the velocity heads during flow through the adsorbent bed.

Definitions

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Additionally, characterizing a stream as, e.g., a "feed stream" or a "desorbent stream" can mean a stream including or rich in, respectively, at least one feed or desorbent.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 30%, preferably about 50%, and optimally about 70%, by mole, of a compound or class of compounds in a stream.

As used herein, the term "adsorbent" relates, but is not limited to, adsorption, and/or absorption and can include an absorbent as well as an adsorbent.

As used herein, the term "adsorber" relates, but is not limited to, adsorption, and/or absorption and can include an absorber as well as an adsorber.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

As used herein, the terms "in the direction of fluid flow" generally means the direction of fluid flow, if laminar, or a majority of the mass of fluid flow, and typically does not include other directions, e.g., eddies, of fluid flow due to, e.g., turbulence.

As used herein, the term "inverted funnel" means that a fluid flow passing through can be dispersed as opposed to being converged. So, the term "inverted funnel" may be used to described a part that can be oriented with respect to a fluid flow, regardless as how it may be orientated with respect to gravity.

As used herein, the term "hemi-pseudosphere" can mean a half of a pseudosphere created by bisecting the pseudosphere by passing a plane through its greatest diameter, i.e., the diameter created by rotating the cusp of a tractrix about its asymptote. Also, the hemi-pseudosphere can terminate at either end, i.e., be finite.

As depicted, process flow lines in the figures can be referred to as lines or streams. Particularly, a line can contain one or more streams.

BRIEF DESCRIPTION OF THE DRAWINGS

FIG. 2 is a schematic, perspective view of an exemplary spacer with a first part depicted in phantom.

FIG. 3 is a schematic, elevational, and cross-sectional view of an exemplary version of a head of a vessel containing an exemplary spacer.

FIG. 4 is a schematic, elevational, and cross-sectional view of another exemplary version of a head of a vessel containing an exemplary spacer.

DETAILED DESCRIPTION

Figure 1:
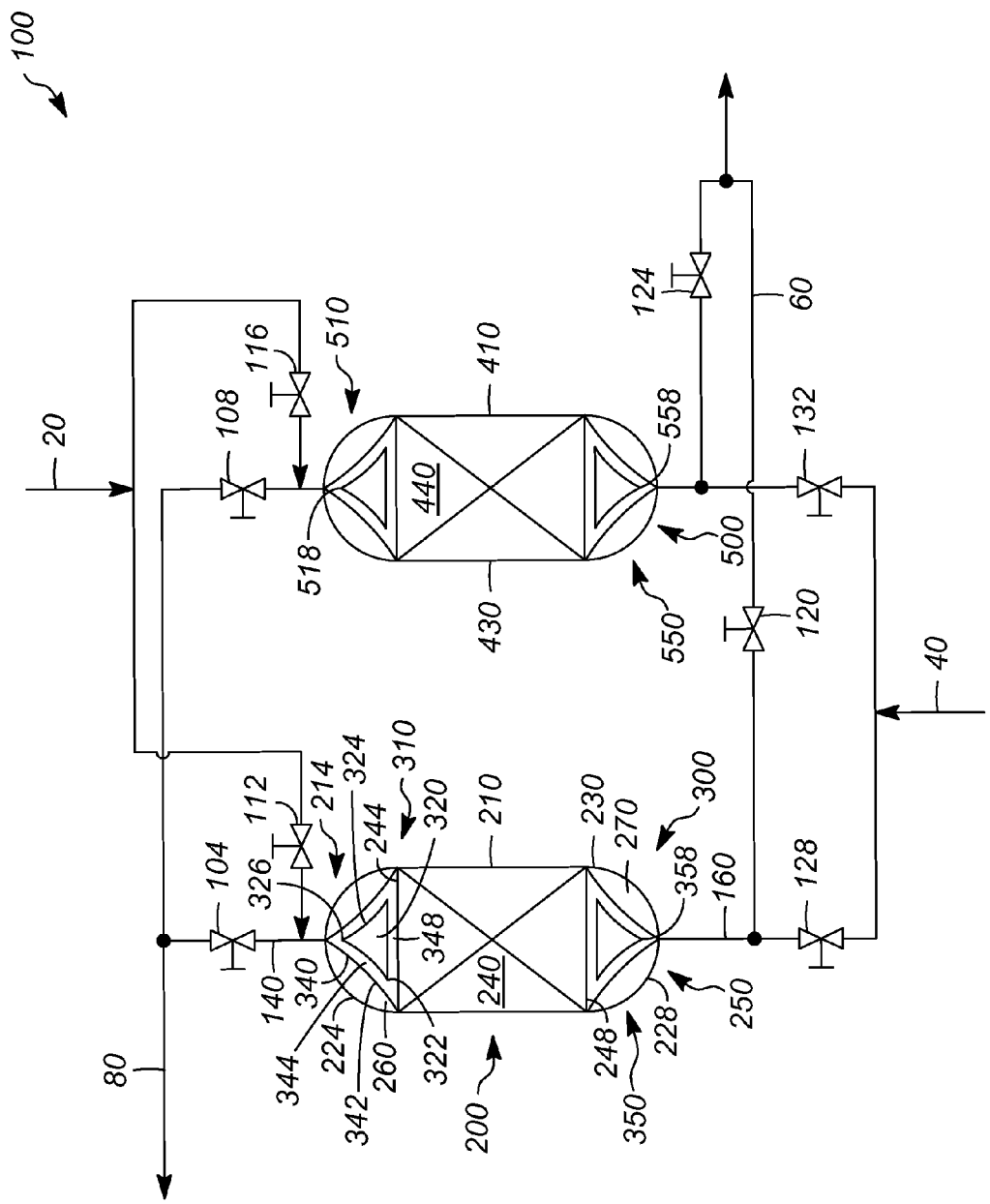
FIG. 1 is a schematic depiction of an exemplary pressure swing adsorption system with some internals of the vessels depicted.

Referring to FIG. 1, an exemplary pressure swing adsorption system 100 can include a plurality of pressure swing adsorber vessels 200. Although a single adsorber vessel may be used, in this exemplary embodiment the system 100 can include a first pressure swing adsorber vessel 210 and a second pressure swing adsorber vessel 410.

Typically, the PSA process can be effectively similar to a "batch" process and the embodiments disclosed herein can fill void volumes to reduce recycling of fluids, such as gases. Generally, the pressure swing adsorption system 100 is operated on an adsorption cycle and a desorption cycle, optionally with each adsorber operating in offsetting adsorbing and desorbing cycles. Particularly, an incoming feed stream 20 can be provided as well as an incoming desorbent stream 40, such as a purge gas. Usually, one vessel is adsorbing while the other is desorbing.

Such adsorption systems may be utilized to purify hydrogen, but other gases may be purified as well. Specific temperature, pressure, and other operating conditions can depend on the design of the particular PSA system, such as the adsorbents, feed gas composition, flow rates, and other parameters. Exemplary pressure swing adsorption systems are as disclosed in, e.g., U.S. Pat. No. 3,430,418; U.S. Pat. No. 3,564,816; U.S. Pat. No. 3,986,849; and U.S. Pat. No. 6,340,382 B1. Generally, a PSA process can provide and improve recovery of high purity hydrogen, such as greater than about 99.9%, by mole, from an incoming feed stream 20 containing more than about 50% mole, preferably about 60-about 90%, by mole, hydrogen.

Although the PSA vessels 210 and 410 can be different, in this exemplary embodiment, the PSA vessels 210 and 410 are substantially similar. As a consequence, only the PSA vessel 210 will be described in detail hereinafter. The PSA vessel 210 can include one or more walls 230 containing at least one adsorbent bed 240 and at least one spacer 300. The at least one spacer 300 can include a first spacer 310 and a second spacer 350.

The at least one adsorbent bed 240 can include any suitable number of beds, such as one, two, or three or more beds. In this exemplary embodiment the at least one adsorbent bed 240 only includes a single adsorbent bed 240. The at least one adsorbent bed 240 can include any suitable molecular sieve such as an alumina sieve, a silica gel, or a zeolite adsorbent. Preferable adsorbents can include a zeolite X or A. Often, the zeolite can be combined with a support, such as an alumina ball, a glass, a plastic, one or more metal balls, a natural rounded stone or a crushed stone. Exemplary molecular sieves and optional supports are disclosed in, e.g., U.S. Pat. No. 3,430,418; U.S. Pat. No. 3,564,816; U.S. Pat. No. 3,986,849; U.S. Pat. No. 6,340,382 B1; and U.S. Pat. No. 7,393,394 B2.

The first pressure swing adsorber vessel 210 can include the one or more walls 230, and has a first end 224 and an opposing second end 228. The one or more walls 230 may surround the at least one adsorbent bed 240 and the first and second spacers 310 and 350. Generally, the one or more walls 230 and the at least one adsorbent bed 240 define at least one void volume 250, namely a first void volume 260 and a second void volume 270. Particularly, the at least one adsorbent bed 240 can have a first side 244 and a second side 248 that can further define a limit to, respectively, the first void volume 260 and the second void volume 270. Generally, such void volumes are undesirable in an adsorbent vessel because such non-selective volumes can decrease the performance of the adsorbent. In one exemplary embodiment, the at least one spacer 300, namely the first spacer 310 and the second spacer 350 can be positioned to eliminate at least about 20%, preferably at least about 50%, by volume, of the respective void volume 260 and 270. Generally, each spacer 310 and 350 can be centered about a center of the vessel 210, as depicted by lines 140 and 160 that are indicative of the center of the vessel 210. Moreover, the spacers 310 and 350 can be coupled to the one or more walls 230 using any suitable means, such as welds or mechanical fasteners.

Referring to FIGS. 1-2, although the first spacer 310 and second spacer 350 can be different, in this exemplary embodiment the spacers 310 and 350, as well as other spacers described hereinafter, can be substantially the same. Thus, only the spacer 310 will be described in further detail hereinafter.

Generally, the first spacer 310 can include a first part 320 and a second part 340. Typically, the first part 320 is a deflector 322, and in one exemplary embodiment, may form a substantial cone-shape 324, although other suitable shapes may be used. Generally, the substantial cone-shape 324 can be similar to a hemi-pseudosphere except an end can terminate in a cusp 326 in one preferred embodiment. The cusp 326 can form any suitable shape, such as pointed, rounded, or blunted. Also, the substantial cone-shape 324 may have a base 330 having any suitable shape, such as a loop or a polygon, and a concave surface 328. Alternatively, the deflector 322 may be a right circular cone, or any other suitable conical shape, such as a pyramid. Usually, the base 330 is positioned generally parallel to the top side 244 of the adsorbent bed 240. Typically, the cusp 326 can be positioned within the adsorber vessel 210 to oppose an incoming feed stream 20 or a desorbent stream 40.

The second part 340 can be a diffuser 342, and can take any suitable shape, such as a hollowed cone. In one exemplary embodiment as depicted, the diffuser 342 can be an inverted funnel or a hemi-pseudosphere. As discussed herein, both ends of the inverted funnel or the hemi-pseudosphere can terminate, i.e. be finite. As an example, a hemi-pseudosphere terminates in an open end that may be coupled to the line 140 and another open end above the adsorbent bed 240. Typically, the deflector 322 can be nested with the diffuser 342. The spacer 310 can form a channel 344 to provide a substantially constant cross-sectional area in a direction of fluid flow to avoid a non-selective volume while minimizing adverse affects with respect to flow distribution and pressure drop. These benefits can be aided by the curved surfaces, which may be at any suitable angle, of the deflector 322 and the diffuser 342. What is more, the base 330 of the deflector 322 and the first side 244 of the at least one adsorbent bed 240 may form a passage 348 between the deflector 322 and the bed 240 where fluid can enter the top of the bed 240. In another exemplary embodiment, the diffuser 342 can fill the first void volume 260, except for the space provided for the deflector 322, the channel 344, and the passage 348. In other exemplary embodiments, the one or more surfaces, independently, of the deflector 322 and the diffuser 342 can be linear. Moreover, the spacer 310 can form the channel 344 and optionally the passage 348 of different shapes as depicted, such as converging or diverging in the direction of fluid flow, or even a combination, such as converging and then diverging.

Generally, the spacer 310 can be fabricated from any suitable non-porous material that is resistant to the feed and purge or desorption streams. Such materials can include metal, such as carbon steel, stainless steel, and titanium, a ceramic, or a plastic material, such as a polycarbonate. Both parts 320 and 340 of the spacer 310 can be fashioned as to be hollow. The spacer 310 can be coupled to the first vessel 210 using any suitable means, such as welds or mechanical fasteners. Typically, the diffuser 342 can be coupled to an inlet of the line 140 at one end 332, and the top of the adsorbent bed 240 at the other end 336. The deflector 322 can be nested with the diffuser 342 and coupled with the deflector 322 and/or the first vessel 210, using any suitable means such as welds or mechanical fasteners.

In addition, the spacer 310 can be fabricated to accommodate a variety of adsorber vessels' shapes and sizes. Particularly, an adsorber may take the shape of a semi-elliptical, flanged, dished, flared, toriconical, or other shape. Referring to FIGS. 3 and 4, the shape of the adsorber vessel can be a semi-elliptical head 214 as depicted in FIG. 3, or a flange head 218 in another exemplary version as depicted in FIG. 4. As a consequence, the spacer 310 can be fabricated to be suitable for either design, and the first part 320 and the second part 340 may at least partially form a corresponding channel 344 and passage 348. Referring to FIG. 1, the shape depicted is semi-elliptical 214.

As mentioned above, the PSA vessels 210 and 410 in FIG. 1 can be substantially similar in this exemplary embodiment. So, the PSA vessel 410 can include one or more walls 430 containing at least one adsorbent bed 440 and at least one spacer 500, namely a first spacer 510 having a cusp 518 and a second spacer 550 having a cusp 558.

In operation, an incoming feed stream 20 can be provided to the pressure swing adsorption system 100. If the first pressure swing adsorber vessel 210 is in adsorption mode, a valve 112 can be open and a valve 104 can be closed. The incoming feed stream 20 can enter the adsorber vessel 210 and pass over the cusp 326 of the spacer 310. Generally, the stream can flow through the channel 344, optionally pass through the passage 348 underneath the base 330, and enter the adsorbent bed 240. Afterwards, the product can exit the adsorbent bed 240, through the channel formed by the spacer 350, past its cusp 358, and exit as a product stream 60 through an open valve 120 with a valve 128 being closed. Meanwhile, the adsorbent bed 440 can be regenerated by passing an incoming desorbent stream 40 past an open valve 132 into the second pressure swing adsorber vessel 410 with a valve 124 closed. The incoming desorbing stream can pass past the second spacer 550 and its cusp 558, through a channel in the second spacer 550, and optionally through a passage between the spacer 550 and the bed 440. Afterwards, the incoming desorbent stream 40 can pass through the at least one adsorbent bed 440 removing impurities, such as hydrogen sulfide and other gases, and pass a channel in the first spacer 510.

That being done, the desorbent stream 40 can exit as a spent or loaded stream 80 through an open valve 108 with a valve 116 closed to exit the pressure swing adsorption system 100. After the adsorbent bed 210 is spent and the adsorbent bed 410 is regenerated, the valves 104, 108, 112, 116, 120, 124, 128, and 132 can switch positions from open to closed or vice-versa to switch the incoming feed stream 20 and incoming desorbent stream 40 through, respectively, adsorber beds 410 and 210.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A pressure swing adsorber vessel, comprising:
    A) one or more walls containing:
        1) an adsorbent bed having a first side and a second side, and the one or more walls and the adsorbent bed defining at least one void volume adjacent to the adsorbent bed; and
        2) at least one spacer forming a cusp positioned in the at least one void volume wherein the cusp is positioned opposing an incoming feed stream or a desorbent stream, wherein the one or more walls and the adsorbent bed form a first void volume and a second void volume wherein each void volume is formed at respective ends of the pressure swing adsorber vessel and wherein the at least one spacer comprises a first spacer positioned within the first void volume and a second spacer positioned within the second void volume.

2. The pressure swing adsorber vessel according to claim 1, wherein a cusp of the first spacer is positioned opposing an incoming feed stream and a cusp of the second spacer is positioned opposing an incoming desorbent stream.

3. The pressure swing adsorber vessel according to claim 1, wherein the at least one spacer has at least a part forming a substantial cone-shape and wherein the at least one spacer comprises a first part, in turn comprising the substantial cone-shape, nested with a second part comprising an inverted funnel.

4. The pressure swing adsorber vessel according to claim 1, wherein the adsorbent bed comprises at least one molecular sieve.

5. A process for minimizing unequal flow distribution in a pressure swing adsorption system, comprising:
    positioning at least one spacer in a void volume of an adsorber vessel wherein the spacer forms a channel having a substantially constant cross-sectional area in a direction of a fluid flow wherein the at least one spacer comprises a deflector nested with a diffuser.

6. The process according to claim 5, wherein the deflector comprises a substantial cone-shape having a concave surface and the diffuser comprises an inverted funnel.

7. The process according to claim 6, wherein a feed stream is provided to the adsorber vessel during an adsorption cycle at one end and a desorbent stream is provided to the adsorber vessel during a desorption cycle at an opposing end of the adsorber vessel.

8. The process according to claim 7, wherein the at least one spacer comprises first and second spacers, wherein each spacer has a respective cusp, and the cusp of the first spacer is positioned opposing an incoming feed stream and the cusp of the second spacer is positioned opposing an incoming desorbent stream.

9. The process according to claim 8, wherein the pressure swing adsorption system comprises a plurality of adsorber vessels operating in offsetting adsorption and desorption cycles.

10. A pressure swing adsorption system, comprising:
A) a first vessel comprising one or more walls, wherein the first vessel contains:
 1) an adsorbent bed having a first side and a second side, and the one or more walls and adsorbent bed define at least one void volume adjacent to the adsorbent bed; and
 2) at least one spacer comprising at least one part forming a hemi-pseudosphere; and
B) a second vessel containing at least one adsorbent bed.

11. The pressure swing adsorption system according to claim 10, wherein the at least one spacer comprises a first part, in turn comprising a substantial cone-shape, and the second part comprising the hemi-pseudosphere.

12. The pressure swing adsorption system according to claim 10, wherein the one or more walls of the first vessel and the adsorbent bed define a first void volume and a second void volume wherein each void volume is formed at respective ends of the first vessel.

13. The pressure swing adsorption system according to claim 12, wherein the at least one spacer comprises a first spacer positioned within the first void volume and a second spacer positioned within the second void volume.

14. The pressure swing adsorption system according to claim 10, wherein the second vessel comprises one or more walls, and the one or more walls and the adsorbent bed form first and second void volumes wherein each void volume is formed at respective ends of the second vessel.

15. The pressure swing adsorption system according to claim 14, wherein the second vessel contains a first spacer positioned within the first void volume and a second spacer positioned within the second void volume.

16. The pressure swing adsorption system according to claim 11, wherein the first part is nested with the second part.

* * * * *